Feb. 5, 1957    A. WITTLIN    2,780,199

FLUID INDICATOR

Filed Nov. 12, 1954

INVENTOR.
Albert Wittlin,
BY Schroeder, Hofgren,
Brady & Wegner.
Attys.

United States Patent Office 2,780,199
Patented Feb. 5, 1957

2,780,199
FLUID INDICATOR
Albert Wittlin, Chicago, Ill.

Application November 12, 1954, Serial No. 468,513

9 Claims. (Cl. 116—117)

This invention relates to a fluid indicator adapted to be inserted in a fluid line for observing the condition of the fluid flowing therethrough.

The indicator of this invention has the advantage of being relatively simple and inexpensive in construction regardless of the size of the indicator. Thus, prior indicators have been relatively economical in small sizes but in large sizes have been not only expensive but also massive and difficult to manufacture.

One of the features of this invention is to provide a fluid indicator comprising a transparent tube having end surfaces, a surrounding elongated protective member within which the tube is located spaced from but closely adjacent to the tube and containing a port through which the tube is viewable, the protective member and tube forming a fluid conduit and the protective member including a pair of inwardly directed projections on opposite sides of the port each adjacent to a tube end, a deformable sealing gasket in sealing engagement with each tube end surface and the inner surface of the protective member adjacent to a projection, and compression means urging each gasket against its tube end surface and into said sealing engagement.

Other features and advantages of the invention will be apparent from the following description of one embodiment thereof as shown in the accompanying drawings. Of the drawings.

Figure 1:
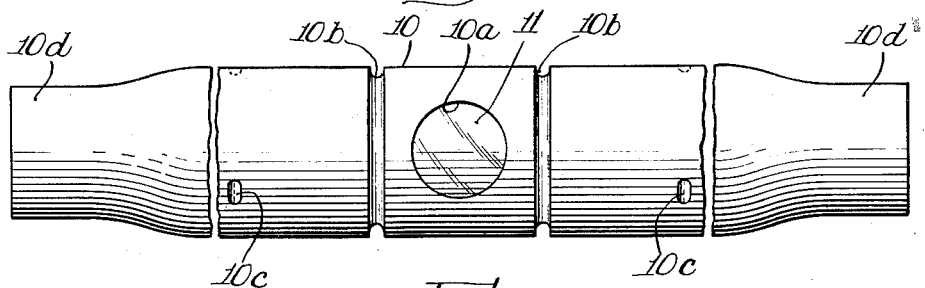
Fig. 1 is a side elevational view of an indicator embodying the invention.
Figure 2:
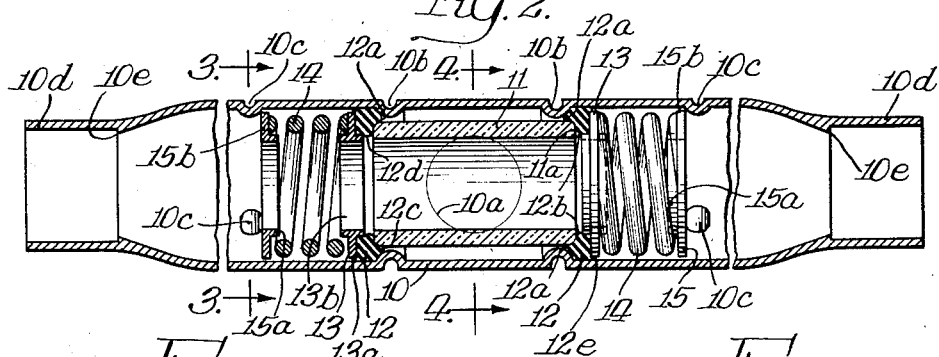
Fig. 2 is a longitudinal section thereof.

The indicator shown in the accompanying drawings comprises an elongated tubular protective member 10, preferably but not necessarily of a relatively soft metal such as copper and containing a pair of oppositely located viewing windows 10a. Positioned within the tubular protective member 10 is a trasparent tube 11 of glass or similar transparent material. The transparent tube 11 is provided with end surfaces 11a. The inner surface of the protective member 10 is spaced from but closely adjacent to the outer surfaces of the transparent tube 11.

A pair of annular inwardly directed projections 10b are porvided in the protective member 10 adjacent to but spaced inwardly of the tube ends 11a. These projections 10b are on opposite sides of the viewing windows or ports 10a.

Bearing against each end of the transparent tube 11 is a sealing gasket 12. Each gasket is preferably made of a deformable rubbery material that is resistant to the fluid normally flowing through the indicator. Each gasket is preferably premolded to have an angular cross section, with one leg 12a lying along the outer surface of the end of the transparent tube and bearing against an annular projection 10b and the other leg 12b abutting against an end surface 11a of the transparent tube 11.

Each gasket 12 is provided with an annular bearing member 13 of generally T-shaped cross section with the base 13a of the T being substantially planar and bearing against the gasket 12, and a second portion 13b of the bearing member being of generally cylindrical shape and substantially aligned with the inner surface of the transparent tube 11.

Each bearing member 13 is adapted to press against a deformable gasket 12. The deformation of each gasket permits one portion 12c to be extruded slightly between a projection 10b and the outer surface of the transparent tube 11, a second portion 12d to be extruded slightly between an end surface 11a of the transparent member and a bearing member 13, and a third portion 12e to be extruded slightly into the spece between the inner surface of the protective member 10 and the outer surface of the bearing member 13.

In order to urge each bearing member 13 against its gasket 12 and thus the gasket into sealing engagement with the transparent tube 11 and the protective member 10, there is provided a coil compression spring 14 at each end of the transparent member having one end bearing against a base 13a of a bearing member 13. The other end of each spring 14 is held by an annular retainer 15. This retainer has a substantially cylindrical inner portion 15a located inwardly of the spring 14 and a planar outer portion 15b against which the spring bears.

Each annular spring retainer 15 is held in place by bearing against a plurality of inwardly directed depressions or dimples 10c in the protective member 10. In the embodiment shown, there are three of these relatively small dimples at each end of the retainer ring and spring assembly with adjacent dimples of each set being spaced about 120° apart.

In order that the retainer rings 15 will clear the dimples 10c, the outer portion 15b of each retainer is provided with a plurality of notches 15c at the outer edge thereof similar in size, spacing and number to the dimples 10c.

In constructing the fluid indicator, the protective member 10 is a straight tubular piece of metal provided with the windows 10a, the annular inwardly directed projections 10b and the dimples 10c. The transparent tube 11 is placed within the protective member 10 by inserting it at one end thereof and positioning it symmetrically with relation to the windows 10a and the projections 10b. The two gaskets are then inserted at each end so as to bear against the end surfaces 11a of the transparent member and the annular projections 10b. Following this, the two bearing members 13 are placed in the opposite ends of the protective member at an angle to the longitudinal axis of the member and moved into position so that they bear against the gaskets 12.

As soon as the above elements have been assembled within the tubular member, the two compression springs 14 are inserted in each end of the protective member 10. Because the outer diameters of these springs are less than the circle described by the innermost surface points of each set of dimples 10c, the springs readily clear the dimples.

Figure 3:
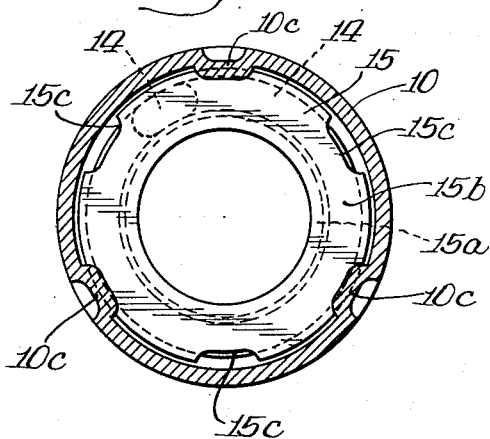
Fig. 3 is a transverse sectional elevation, taken substantially along line 3—3 of Fig. 2.
Figure 4:
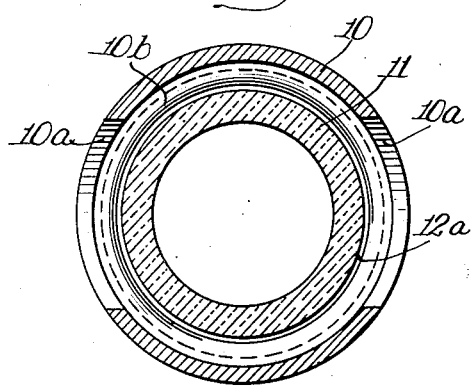
Fig. 4 is a transverse sectional elevation, taken substantially along line 4—4 of Fig. 2.

After the springs have been inserted, the two annular spring retainers 15 are inserted into ends of the protective member 10. Each retainer 15 is positioned relative to the protective member 10 so that the notches 15c are aligned with its dimples 10c. Each retainer 15 is then moved inwardly past the dimples 10c to compress the springs 14, and the retainers 15 are then rotated roughly 60° so that the notches 15c are no longer aligned with the dimples 10c. In this position, as illustrated in Figure 3, the two sets of dimples 10c serve to hold the spring retainers in place and apply sealing pressure to the washers 12.

After the above elements have been completely assembled, the two ends 10d of the protective member are then spun down to a reduced diameter. In the preferred construction the inner extremity of this reduced diameter of each end 10d is provided with an inwardly projecting annular flange 10e. These flanges 10e serve to locate the inner ends of fluid lines (not shown) which are adapted to be telescoped into the protective member ends 10d and attached thereto in fluid-tight relationship as by welding, brazing or the like.

As can be seen from the above description of the invention, the fluid indicator of this invention can be produced in any size desired. Furthermore, the construction is kept relatively simple as the various stops for the springs and gaskets are provided by deforming the tubular protective member or casing of the indicator.

With this construction the glass tube 11 is centered within the protective member 10 by the premolded gaskets 12 bearing against the inwardly projecting rings 10b and the glass tube. The bearing members 13 are held properly aligned within the member 10 by pressure of these bearing members against the gaskets 12. The springs 14 are held properly aligned within the protective member 10 by the bearing members 13 and the retainers 15. Thus, the entire assembly is held symmetrically centered and with a minimum of parts to provide uninterrupted flow of fluid through the indicator, ready accessibility and a dependable non-leaking construction.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. A fluid indicator, comprising: a transparent tube having end surfaces; a surrounding elongated protective member within which the tube is located spaced from but closely adjacent to the tube and containing a port through which the tube is viewable, the protective member and tube forming a fluid conduit and the protective member having a first inwardly directed projection on one side of the port adjacent to one end of said tube and a second inwardly directed projection on the other side of the port adjacent to the other end of said tube, each of said projections including an inwardly directed deformation in said protective member; a first deformable sealing gasket in sealing engagement with one end surface of the tube and with the corresponding projection; a second deformable sealing gasket in sealing engagement with the other end surface of the tube and with its corresponding projection; a resilient compression member within said protective member operatively pressing said gaskets into said sealing engagement; and a seat member within said protective member on the side of the compression member opposite to the gasket against which said compression member operatively bears.

2. The indicator of claim 1 wherein each projection is of annular shape extending around the inner surface of the protective member.

3. The indicator of claim 1 wherein each gasket is of molded construction having an angular cross section with one leg thereof bearing against a tube end surface and the other leg positioned between the tube and inner surface of the protective member and bearing against a projection.

4. A fluid indicator, comprising: a transparent tube having end surfaces; a surrounding elongated protective member within which the tube is located spaced from but closely adjacent to the tube and containing a port through which the tube is viewable, the protective member and tube forming a fluid conduit and the protective member having a first inwardly directed projection on one side of the port adjacent to one end of said tube and a second inwardly directed projection on the other side of the port adjacent to the other end of said tube, each of said projections including an inwardly directed deformation in said protective member of generally annular shape; a first deformable sealing gasket in sealing engagement with one end surface of the tube and with the corresponding projection; a second deformable sealing gasket in sealing engagement with the other end surface of the tube and with its corresponding projection, each gasket being of molded construction having an angular cross-section with one leg thereof bearing against a tube end surface and the other leg positioned between the tube and inner surface of the protective member and bearing against a projection; a resilient compression member within said protective member operatively pressing said gaskets into said sealing engagement; and a seat member within said protective member on the side of the compression member opposite to the gasket against which said compression member operatively bears.

5. A fluid indicator, comprising: a transparent tube having end surfaces; a surrounding elongated protective member within which the tube is located spaced from but closely adjacent to the tube and containing a part through which the tube is viewable, the protective member having a first inwardly directed projection on one side of the port adjacent to one end of said tube and a second inwardly directed projection on the other side of the port adjacent to the other end of said tube, each of said projections including an inwardly directed deformation in a wall of said protective member and integral therewith; a first deformable sealing gasket in sealing engagement with one end surface of the tube and with the corresponding projection; a second deformable sealing gasket in sealing engagement with the other end surface of the tube and with its corresponding projection; annular bearing means on the side of each gasket opposite to a tube end surface operatively supporting said side of the gasket; a compression spring means urging each bearing member and thus a gasket toward its tube end surface; and anchoring means for the opposite end of said spring including an annular spring retainer engaging said opposite end and engaging said inner surface portion on said protective member.

6. The fluid indicator of claim 5 wherein said spring retainer is held in place by an inwardly directed projection on the inner surface of said protective member against which said retainer bears.

7. A fluid indicator, comprising: a transparent tube having end surfaces; a surrounding elongated protective member within which the tube is located spaced from but closely adjacent to the tube and containing a port through which the tube is viewable, the protective member having a first inwardly directed projection on one side of the port adjacent to one end of said tube and a second inwardly directed projection on the other side of the port adjacent to the other end of said tube, each projection being of annular shape formed from an inwardly directed groove in said protective member; a deformable sealing gasket in sealing engagement with each tube end surface and the inner surface of the protective member adjacent to a projection, each kasket being of molded construction having an inwardly directed groove in said protective member; an annular bearing member on the side of each gasket opposite to a tube end surface; a compression spring urging each bearing member and thus a gasket toward said end surface; an annular spring retainer engaging said opposite end and engaging a plurality of spaced inwardly directed projections on the inner surface of said protective member against which said retainer bears, each projection having a height less than the width of the retainer and the retainer having cut-away edge portions permitting the retainer to clear the projections when the edge portions are aligned therewith.

8. The fluid indicator of claim 7 wherein said spaced projections are each formed by an inwardly directed deformation in said protective member.

9. A fluid indicator, comprising: a transparent tube having end surfaces; a surrounding elongated protective member within which the tube is located spaced from but closely adjacent to the tube and containing a port through which the tube is viewable, the protective member having a first inwardly directed projection on one side of the port adjacent to one end of said tube and a second inwardly directed projection on the other side of the port adjacent to the other end of said tube; a deformable sealing gasket in sealing engagement with each tube end surface and the inner surface of the protective member adjacent to a projection; an annular bearing member on the side of each gasket opposite to a tube end surface; a compression spring urging each bearing member and thus a gasket toward said end surface; an inner surface portion on the protective member adjacent to the end of each spring that is opposite to said gasket; and anchoring means for the opposite end of said spring including an annular spring retainer engaging said opposite end and engaging said inner surface portion on said protective member, said protective member having a plurality of spaced inwardly directed projections on the inner surface of said protective member against which said retainer bears, each projection having a height less than the width of the retainer and the retainer having cut-away edge portions permitting the retainer to clear the projections when the edge portions are aligned therewith.

References Cited in the file of this patent

UNITED STATES PATENTS 2,725,844     Wittlin _____ Dec. 6, 1955